Dec. 21, 1943.  T. A. RYALS  2,337,350

DOOR ANTIRATTLER

Filed Aug. 24, 1942

Inventor

Thomas A. Ryals

By Clarence A. O'Brien
and Harvey B. Jacobson
Attorneys

UNITED STATES PATENT OFFICE 2,337,350

DOOR ANTIRATTLER

Thomas A. Ryals, Luray, Tenn.

Application August 24, 1942, Serial No. 455,930

1 Claim. (Cl. 16—86)

The present invention relates to new and useful improvements in door anti-rattlers particularly for motor vehicles and has for its primary object to provide, in a manner as hereinafter set forth, a device of this character which is adapted to be expeditiously adjusted to compensate for wear.

Other objects of the invention are to provide an automobile door anti-rattler of the aforementioned character which will be comparatively simple in construction, strong, durable, highly efficient and reliable in use, compact, inconspicuous and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein—

Figure 1:
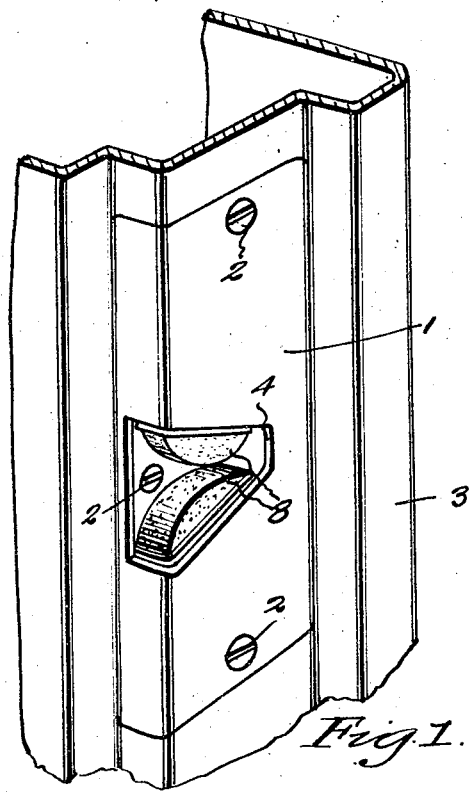
Figure 1 is a perspective view of an anti-rattler constructed in accordance with the present invention.
Figure 2:
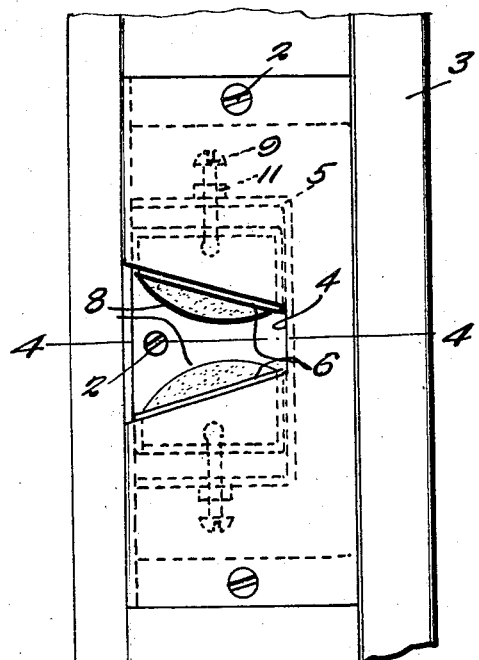
Figure 2 is a view in side elevation thereof.
Figure 3:
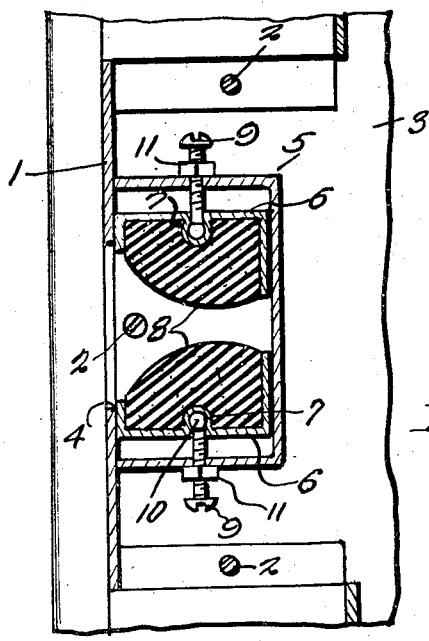
Figure 3 is a vertical sectional view, taken substantially on the line 3—3 of Figure 4.
Figure 4:
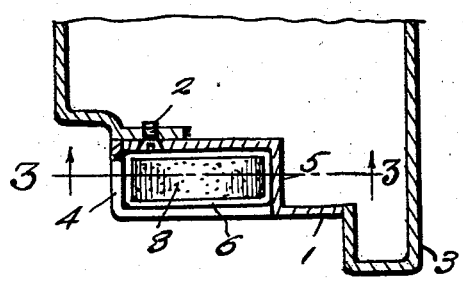
Figure 4 is a view in horizontal section, taken substantially on the line 4—4 of Figure 2.

Referring now to the drawing in detail, it will be seen that the embodiment of the invention which has been illustrated comprises a metallic plate 1 of angular horizontal section which is secured by screws 2 in position on the metal door frame post 3 of the vehicle. The walls of the angular plate 1 have formed therein an opening 4 of substantially the shape shown to advantage in Figure 1 of the drawing.

On the inner side of the plate 1 is a metallic housing 5 with which the opening 4 communicates. Mounted for vertical sliding adjustment toward and away from each other in the housing 5 is a pair of opposed metallic cups or holders 6. The bottoms of the cups 6 are formed to provide sockets 7. Substantially segmental rubber blocks 8 are mounted in the cups 6 and molded around the sockets 7 by which said blocks are positively anchored in said cups.

Threadedly mounted in the top and bottom of the housing 5 are adjusted screws 9. The screws 9 are provided, on one end, with ball heads 10 which are journaled in the sockets 7 for rotatably connecting said screws to the cups 6. Lock nuts 11 secure the screws 9 in adjusted position.

It is thought that the manner in which the device functions will be readily apparent from a consideration of the foregoing.

Of course, the rubber blocks 8 are adapted to receive therebetween a suitable substantially wedge-shaped member on the free end of the automobile door (not shown). In this manner the door is firmly secured against vibration and rattling. As wear occurs the blocks 8 may be expeditiously and accurately adjusted as desired by removing the plate 1 thereby permitting access to be had to the screws 9. Of course, the lock nuts 11 are loosened to permit adjustment of the screws 9, after which said lock nuts are again tightened.

It is believed that the many advantages of an anti-rattler constructed in accordance with the present invention will be readily understood and although a preferred embodiment is as illustrated and described, it is to be understood that changes in the details of construction and in the combination and arrangement of parts may be resorted to which will fall within the scope of the invention as claimed.

Having described the invention, what is claimed as new is:

A door anti-rattler of the character described comprising a plate of angular horizontal section for mounting on a door frame post, said plate having an opening therein, a housing on the plate communicating with the opening, cups slidably mounted for vertical adjustment in the housing, the bottoms of said cups including circular sockets within the cups, rubber blocks mounted in the cups and having circular countersinks therein fitting over the sockets, screws threadedly mounted for adjustment in the housing, ball ends on said screws journaled in the sockets for connecting the cups to said screws for adjustment thereby, and means for securing the screws in adjusted position.

THOMAS A. RYALS.